No. 887,338. PATENTED MAY 12, 1908.
F. T. MOORE.
BRIDLE BLIND.
APPLICATION FILED JULY 25, 1907.

Witnesses
Edwin F. Fay
Percy B. Hills

Inventor
Frederick T. Moore
By Edwin L. Jewell,
his Attorney

UNITED STATES PATENT OFFICE.

FREDERICK T. MOORE, OF GEYSERVILLE, CALIFORNIA.

BRIDLE-BLIND.

No. 887,338.　　　Specification of Letters Patent.　　　Patented May 12, 1908.

Application filed July 25, 1907. Serial No. 385,492.

*To all whom it may concern:*

Be it known that I, FREDERICK T. MOORE, a citizen of the United States, residing at Geyserville, in the county of Sonoma and State of California, have invented certain new and useful Improvements in Bridle-Blinds, of which the following is a specification.

Figure 1:
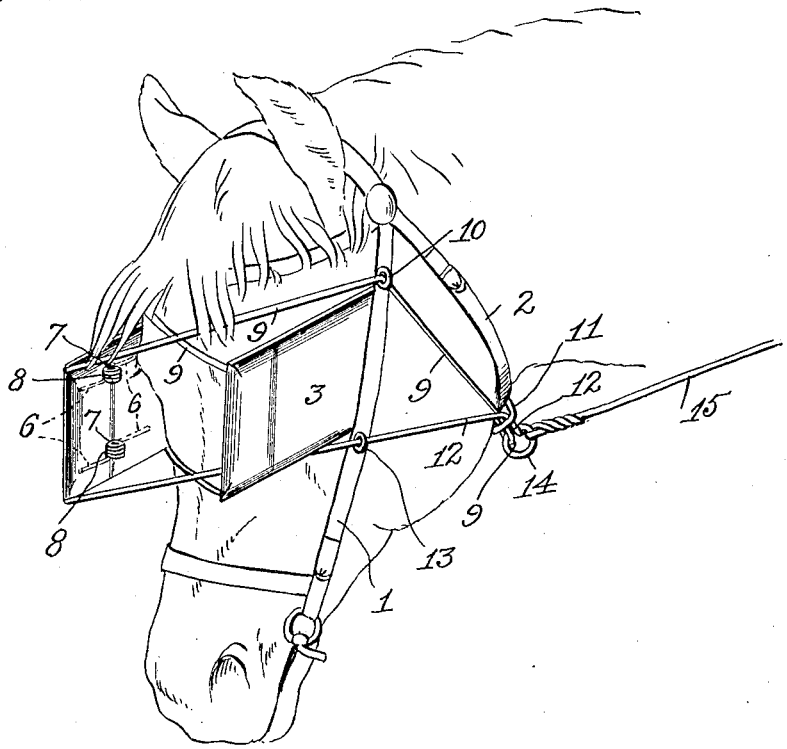
Figure 2:
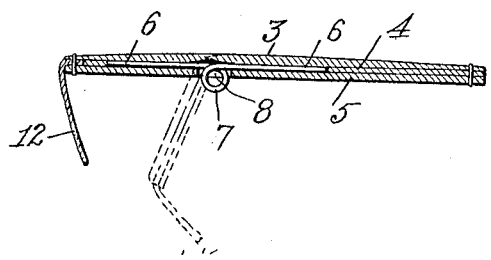

My invention relates to blinds for bridles, and has for its object to provide certain improvements in the construction of the same whereby the mechanism for causing the same to completely blind the animal is materially simplified, as will be hereinafter more definitely pointed out and claimed, reference being had to the accompanying drawing, in which:

Figure 1 is a perspective view of my improved construction shown attached to a bridle in position on a horse's head. Fig. 2 is an enlarged detail longitudinal sectional view of one of the blinds.

Similar numerals of reference denote corresponding parts in the two views.

In the said drawing the reference numeral 1 denotes the usual side strap of bridle and 2 the throat latch thereof. Fixed to the side straps in the usual manner are my improved blinds, the same being formed of an outer layer 3, an intermediate layer 4, and an inner layer 5, preferably of leather or other flexible material. Located between the outer and inner layers of each blind are two springs having their ends 6 extending for a distance in opposite directions between said layers and their central coiled portions 7 projecting through apertures 8 in the inner layer 5 of the blind. Normally the ends 6 of said springs under the tension of the coiled portions thereof will lie in the same place, so as to maintain their blinds in the position shown in full lines in Fig. 2. Attached to the upper outer end of each of said blinds is a strap 9 that is crossed across the forehead of the animal, and passes through eyelets 10 fixed to the side straps 1 of the bridle passing from thence beneath the throat of the animal and having its looped end passed through a loop 11 attached to the throat latch 2, as shown. Similarly a strap 12 is connected to the lower ends of the blinds and similarly crossed and passed through eyelets 13 on the side straps 1 and through loop 11. At their inner ends said loops are passed through a ring 14 that is too large to pass through loop 11 and also has connected thereto a rein 15 that passes back to within reach of the driver.

In use the spring ends 6 will normally maintain the blinds in the position shown in Fig. 1, but when the rein 15 is pulled the looped ends of straps 9 and 12 will be drawn backward, thereby folding the outer ends of the blinds towards each other, as shown in dotted lines in Fig. 2, and causing the same to completely cover the eyes of the animal, as will be readily understood.

Having thus described my invention, what I claim as new and desire to secure by Letters Patent, is:

1. A blind for bridles, embodying a flexible body portion formed of a plurality of layers of material, and one or more springs having oppositely extended arms lying between said layers, and a central coiled portion projecting through an aperture in the inner layer of said body portion, said spring or springs adapted to normally maintain said blind in a flat position but adapted to yield under a pull to permit said blind to fold on a line with said coiled portion.

2. The combination with a bridle, a pair of blinds attached thereto at their inner ends and adapted to fold vertically intermediate their length, and means for normally maintaining said blinds in their open or flat position, a strap connected to the outer upper ends of said blinds and crossed at its front and looped at its rear beneath the throat of the animal, a similar strap connected to the lower outer ends of said blinds and similarly crossed and looped and a rein connected to said loops for retracting said straps and folding said blinds.

3. The combination with a bridle, a pair of blinds attached thereto at their inner ends and adapted to fold vertically intermediate their length, and means for normally maintaining said blinds in their open or flat position, of a strap connected to the outer upper ends of said blinds and crossed at its front and looped at its rear beneath the throat of the animal, a similar strap connected to the lower outer ends of said blinds and similarly crossed and looped, a loop on said bridle beneath the throat of the animal through which the looped ends of said straps are passed, a ring larger than said loop with which said loops are engaged and a rein connected to said ring for retracting said straps and folding said blinds.

In testimony whereof I affix my signature, in presence of two witnesses.

FREDERICK T. MOORE.

Witnesses:
C. R. MILLER,
HENRY ALPERS.